United States Patent [19]

Scheurenbrand et al.

[11] 4,404,983
[45] Sep. 20, 1983

[54] MOTOR VEHICLE FUEL TANK WITH HEAT RESPONSIVE CLOSURE MEANS

[75] Inventors: Dieter Scheurenbrand, Ostfildern; Einhard Kleinschmit, Esslingen, both of Fed. Rep. of Germany

[73] Assignee: Daimler-Benz Aktiengesellschaft, Fed. Rep. of Germany

[21] Appl. No.: 200,578

[22] Filed: Oct. 24, 1980

[30] Foreign Application Priority Data

Oct. 24, 1979 [DE] Fed. Rep. of Germany ....... 2942922

[51] Int. Cl.³ ............................................. F16K 17/38
[52] U.S. Cl. .................................. 137/74; 220/88 R; 285/423; 285/158; 285/DIG. 16
[58] Field of Search ............... 285/162, 158, 338, 423, 285/196, DIG. 16, 222, 214; 220/7 L, 86 R, DIG. 24, 88 R, 89 B, 900, DIG. 12, DIG. 23, DIG. 33; 280/5 R, 5 A; 137/67, 72, 74; 222/54

[56] References Cited

U.S. PATENT DOCUMENTS

| 936,444 | 10/1909 | Gillon | 285/222 X |
|---|---|---|---|
| 3,606,958 | 9/1971 | Coffman | 280/5 R |
| 3,805,829 | 4/1974 | Yamamoto | 280/5 A |
| 3,863,960 | 2/1975 | Andersson | 285/162 X |
| 3,989,282 | 11/1976 | Zimmerman | 285/222 |
| 4,072,159 | 2/1978 | Kurosawa | 137/67 |
| 4,143,670 | 3/1979 | Olson | 137/72 |
| 4,174,245 | 11/1979 | Murtineau | 220/88 R |
| 4,191,244 | 3/1980 | Kueke | 285/162 X |
| 4,234,218 | 11/1980 | Rogers | 285/162 |
| 4,267,853 | 5/1981 | Yamaguchi | 137/67 |

FOREIGN PATENT DOCUMENTS

| 883401 | 7/1953 | Fed. Rep. of Germany | 285/214 |
|---|---|---|---|
| 2337486 | 7/1977 | France | 285/162 |
| 30022 | of 1911 | United Kingdom | 285/222 |

*Primary Examiner*—Dave W. Arola
*Attorney, Agent, or Firm*—Craig & Burns

[57] ABSTRACT

A fuel tank of a synthetic resinous material, especially for motor vehicles, with a connecting socket of a synthetic resinous material arranged in a lower zone of the fuel tank. The connecting socket is provided on its outside wall with a metal sleeve. The metal sleeve freely projects into an interior of a fuel tank and terminates beyond an inner end of the connecting socket. An outer end of the metal sleeve is set back or axially spaced from an outer end of the connecting socket.

9 Claims, 2 Drawing Figures

MOTOR VEHICLE FUEL TANK WITH HEAT RESPONSIVE CLOSURE MEANS

The present invention relates to a fuel tank and, more particularly, to a motor vehicle fuel tank formed of a synthetic resinous material which includes a connecting socket of a synthetic resinous material arranged in a lower zone of the tank.

In the construction of fuel tanks for motor vehicles, especially passenger motor vehicles, certain fire code safety conditions must be met such as, for example, the fuel tank must be capable of withstanding an open flame exposure from below for a predetermined period of time. This safety condition also holds true for any connecting pipes or lines providing access to the fuel tank which are located in a lower zone of the fuel tank such as, for example, the pipes or lines which are utilized for withdrawing or returning of fuel. These pipes or lines are open to exposure by flames on all sides and are especially dangerous because of the relatively small cross section of the pipes or lines.

In proposed fuel tanks, the prevention of leaks in a region of connection points of sockets with fuel line hoses connected thereto is not insured and, consequently, such connections represent a serious hazard in case of exposure to fire which may result, for example, from a collision of the motor vehicle. This hazard is essentially due to the fact that, when the connections and sockets are exposed to flames on all sides, they are cooled to a lesser extent by the fuel present in the tank from the fuel tank proper. Consequently, these connection means heat up faster when the tank is exposed to fire and also soften more rapidly, whereby the connection to the attached fuel line or pipe springs a leak and fuel escapes which ignites and can increase the hazards of the fire.

The aim underlying the present invention essentially resides in providing a fuel tank constructed of a synthetic resinuous material which provides for the required fireproofing of the fuel tank even at connecting sockets exposed to the fire.

In accordance with advantageous features of the present invention, a fuel tank of a synthetic resinous material is provided with a connecting socket on its inner wall with the connecting socket including a metal sleeve extending with its inner end beyond an inner end of the connecting socket so as to terminate freely in the fuel tank, with an outer end of the sleeve being set back with respect to an outer end of the connecting socket.

By virtue of the above-noted features of the present invention, since the metal sleeve terminates in a free end within an interior of the fuel tank, the metal sleeve when heated by flames to which the fuel tank and conduits entering the fuel tank are exposed is cooled by the fuel present in the fuel tank. Consequently, the heat is conducted away from the connecting socket of synthetic resinous material into the fuel in the fuel tank. Moreover, the overlapping end of the synthetic resinous socket at the outer end thereof, wherein the metal sleeve is set back, will become soft when exposed to the flames so as to contract and sealingly close the opening of the metal sleeve thereby preventing the escaping of fuel from the fuel tank.

Additionally, by virtue of the present invention, the metal sleeve provides a support for the socket of synthetic resinous material so that it cannot buckle and collapse when being heated by virtue of exposure to flames.

Advantageously, the metal sleeve is set back with its outer end by at least a half of its outer diameter with respect to an outer end of the connecting socket so that a sealing of the metal sleeve aperture by the melting overlapping portion of the synthetic resinous material of the socket is insured. As can readily be appreciated, the degree of overlapping may be chosen to be larger and, in any case, is dependent upon the respective position of the connecting socket.

In accordance with further features of the present invention, the connecting socket may be arranged to project with respect to a contour of the tank or to be at least countersunk with respect to such contour so that the socket can be readily adapted to given space conditions.

Accordingly, it is an object of the present invention to provide a fuel tank for motor vehicles formed of a synthetic resinous material which avoids, by simple means, shortcomings and disadvantages encountered in the prior art.

Another object of the present invention resides in providing a fuel tank of a synthetic resinous material for motor vehicles which is maximally fireproof even at connecting sockets of the fuel tank for connecting fuel lines thereto.

Yet another object of the present invention resides in providing a fuel tank of synthetic resinous material for motor vehicles which seals off openings to connecting lines of the fuel tank when the fuel tank and/or connecting lines are exposed to fire.

A still further object of the present invention resides in providing a fuel tank of a synthetic resinous material for motor vehicles which is simple in construction and therefore relatively inexpensive to manufacture.

Yet another object of the present invention resides in providing a fuel tank of a synthetic resinous material for motor vehicles which minimizes, if not avoids, any leaking of the fuel tank at connecting points of lines to the fuel tank.

These and other objects, features and advantages of the present invention will become more apparent from the following description when taken in connection with the accompanying Figures which show, for the purpose of illustration only, one embodiment in accordance with the present invention, and wherein.

Figure 1:
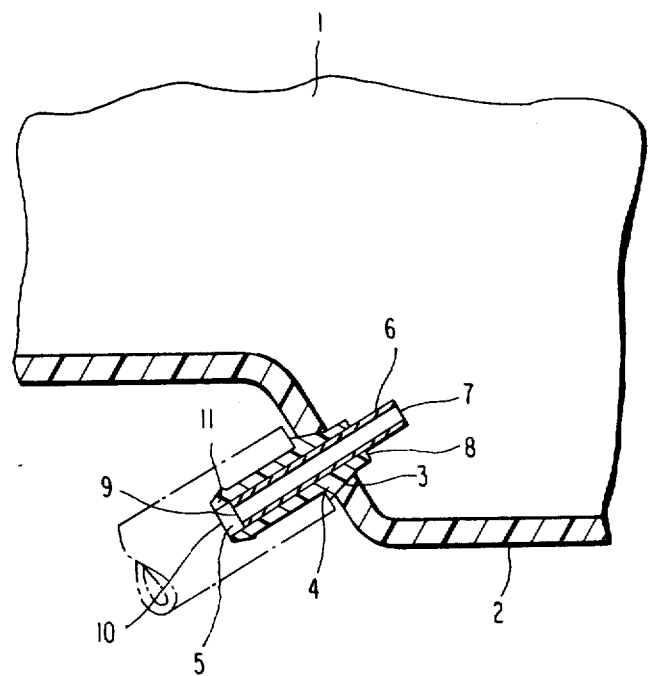
FIG. 1 is a partial cross-sectional view of a connecting socket and a fuel tank constructed in accordance with the present invention prior to sealing.
Figure 2:
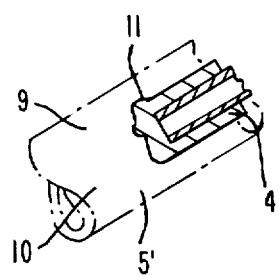
FIG. 2 shows a partial cross-sectional view of the connecting socket and a fuel tank constructed in accordance with the invention.

Referring now to FIG. 1, a fuel tank 1 is provided and is formed of a synthetic resinous material, with the tank 1 having a tank wall 2 and, in a lower zone thereof, a cut out or opening 3 which is adapted to receive a connecting socket 4 also formed of a synthetic resinous material. The connecting socket 4 having an appropriate shape so as to be accommodated in the cut out or opening 3. An axially extending continuous bore 5 is provided in the connecting socket 4 into which is inserted a metal sleeve 6. The sleeve is accommodated in the bore 5 in such a manner that an outer circumference of the metal sleeve 6 firmly contacts an inside wall of the socket 4. The metal sleeve 6 is arranged so as to freely project into the fuel tank 1 and terminate at an inner end 7 axially spaced from an inner end 8 of the connecting socket 4 thereby enabling the free end of the metal sleeve 6 to be surrounded by the fuel and cooled thereby. An outer end 9 of the metal sleeve 6 is set back or axially spaced with respect to an outer end 10 of the connecting socket 4. Advantageously, the set back or axial spacing between the outer end 9 of the metal sleeve 6 and the outer end 10 of the connecting socket 4 is at least a half of the outer diameter of the metal sleeve 6 so that an overlapping section 11 of the synthetic resinous material of the socket 4 is produced which, if melted, is drawn into the opening of the metal sleeve 6 so as to seal the same as shown in FIG. 2.

The connecting socket 4 may be mounted in the tank wall 2 by, for example, friction welding, cementing, or other known connecting methods or integrally molded to the fuel tank 1 by a blow molding procedure.

While we have shown and described only one embodiment in accordance with the present invention, it is understood that the same is not limited thereto but is susceptible to numerous changes and modifications as known to one having ordinary skill in the art and we therefore do not wish to be limited to the details shown and described herein but intend to cover all such changes and modifications as are encompassed by the scope of the appended claims.

We claim:

1. A fuel tank for motor vehicles, the tank being potentially subject to excessive heat, the fuel tank including at least one connecting socket means having a fluid outlet for enabling a connecting of a fuel line to the fuel tank, the connecting socket means being arranged in a lower zone of the fuel tank and including an axially extending bore, and comprising
   a metal sleeve means arranged in the bore of the connecting socket means so that an inner end of the metal sleeve means freely projects into an interior of the fuel tank beyond an inner end of the connecting socket means for transmitting heat to said interior at a greater rate than the heat transmitting rate of the socket means,
   an outer end of the metal sleeve means is located within and axially spaced from an outer end of the connecting socket means,
   the connecting socket means having a greater capacity than the metal sleeve means to deform for sealing the fluid outlet upon application of excessive heat and upon application of excessive heat the connecting socket means deforms to seal the fluid outlet.

2. A fuel tank according to claim 1, characterized in that the fuel tank and connecting socket means are formed of a synthetic resinous material.

3. A fuel tank according to claim 2, characterized in that the axial spacing of the outer end of the metal sleeve from the outer end of the connecting socket means is equal to at least one-half of an outer diameter of the metal sleeve.

4. A fuel tank according to one of claims 1, 2, or 3, characterized in that an outer end of the connecting socket means projects beyond an outer contour of the fuel tank.

5. A fuel tank according to one of claims 1, 2, or 3, characterized in that the connecting socket means is arranged so as to be at least partially countersunk with respect to an outer contour of the fuel tank.

6. A fuel tank according to claim 1, wherein the connecting socket means extends axially away from the fuel tank beyond the end of the metal sleeve therein.

7. In a fuel tank for motor vehicles having an interior and an outer fluid containing contour with a fluid outlet in communication with the interior of the fuel tank thereto,
   the fuel tank being potentially subject to excessive heat
   the improvement comprising
   means for deforming upon application of excessive heat to seal the fluid outlet and
   means for transmitting a portion of said excessive heat inwardly past the fluid containing contour to the interior of the fuel tank,
   the means for transmitting having a greater capacity to conduct heat to the interior of the fuel tank than the means for deforming and
   the means for deforming having a greater capacity to deform than the means for transmitting upon the application of the excessive heat, wherein said means for transmitting comprises
   a sleeve means one end of which is disposed within the means for deforming and the other end is in the interior of the fuel tank.

8. In a fuel tank for motor vehicles having an interior and an outer fluid containing contour with a fluid outlet in communication with the interior of the fuel tank thereto,
   the fuel tank being potentially subject to excessive heat
   the improvement comprising
   means for deforming upon application of excessive heat to seal the fluid outlet and
   means for transmitting a portion of said excessive heat inwardly past the fluid containing contour to the interior of the fuel tank,
   the means for transmitting having a greater capacity to conduct heat to the interior of the fuel tank than the means for deforming and
   the means for deforming having a greater capacity to deform than the means for transmitting upon the application of the excessive heat, and wherein said means for transmitting comprises
   a sleeve means one end of which is disposed within the means for deforming and the other end is in the interior of the fuel tank.

9. The improvement in a fuel tank as set forth in one of claims 7 or 8, wherein
   said means for deforming comprises
   means connecting the fluid outlet to a fuel line comprising a socket means one end of which extends from the fluid outlet of the fuel tank beyond said means for transmitting.

* * * * *